United States Patent [19]
Yamamoto et al.

[11] Patent Number: 5,966,198
[45] Date of Patent: Oct. 12, 1999

[54] PRINTER/PROCESSOR

[75] Inventors: Yuji Yamamoto, Wakayama; Hidetoshi Nishikawa; Yasutaka Kayama, both of Wakayama-ken, all of Japan

[73] Assignee: Noritsu Koki Co, Ltd, Wakayama, Japan

[21] Appl. No.: 08/989,978

[22] Filed: Dec. 12, 1997

[30] Foreign Application Priority Data

Dec. 12, 1996 [JP] Japan .................................. 8-331742

[51] Int. Cl.⁶ ........................... G03B 27/32; G03B 27/52
[52] U.S. Cl. .............................................. 355/27; 355/40
[58] Field of Search .................................. 355/27, 29, 40, 355/42, 43, 44, 41, 54, 50; 396/319, 322, 612, 613

[56] References Cited

U.S. PATENT DOCUMENTS

| | | |
|---|---|---|
| 3,727,499 | 4/1973 | Boston . |
| 3,992,089 | 11/1976 | Hirose et al. . |
| 4,724,463 | 2/1988 | Matsumoto ................................ 355/29 |
| 4,736,937 | 4/1988 | Okuda et al. . |
| 4,941,377 | 7/1990 | Ishihara et al. ........................... 83/211 |
| 5,296,906 | 3/1994 | Hano et al. ............................. 355/311 |
| 5,317,358 | 5/1994 | Kawada .................................. 354/319 |
| 5,550,613 | 8/1996 | Hasegawa et al. ....................... 355/41 |
| 5,715,034 | 2/1998 | Yamamoto .............................. 355/40 |
| 5,715,036 | 2/1998 | Akira et al. ............................. 355/40 |
| 5,745,220 | 4/1998 | Okazaki et al. ......................... 355/54 |

FOREIGN PATENT DOCUMENTS

| | | |
|---|---|---|
| 5782332 | 11/1955 | Japan . |
| 52-135721 | 11/1977 | Japan .............................. G03B 27/00 |
| 56-42227 | 4/1981 | Japan .............................. G03B 27/52 |
| 59-34261 | 8/1984 | Japan .............................. G03B 27/46 |

OTHER PUBLICATIONS

Derwent Abstract of Japan Patent No. 59–000029.
Derwent Abstract of Japan Patent No. 59–034291.
Patent Abstract of Japan Patent Application No. 59–028163.
Patent Abstract of Japan Patent Application No. 51–073683.
Patent Abstract of Japan Patent Application No. 51–027938.
Patent Abstract of Japan Patent Application No. 60–138469.
Patent Abstract of Japan Patent Application No. 06–264143.

*Primary Examiner*—Safet Metjahic
*Assistant Examiner*—Hung Henry Nguyen
*Attorney, Agent, or Firm*—Fulbright & Jaworski, LLP

[57] ABSTRACT

A printer/processor for performing printing processes on both piece negatives taken out of a negative sheet and an elongate negative film. This printer/processor includes a negative sheet loader (2a) for receiving the negative sheet (10) containing the piece negatives (NP), a handling device (6) for drawing the piece negatives out of the negative sheet, an elongate negative film inlet (2c) for receiving the elongate negative film NF, a transport line (130) extending to an exposing section (110), and a branching device (8) selectively movable between a first position to form a passage for connecting the handling device and the transport line, and a second position to form a passage for connecting the elongate negative film inlet and the transport line.

9 Claims, 14 Drawing Sheets

PRINTER/PROCESSOR

BACKGROUND OF THE INVENTION

1. Field of the Invention

This invention relates to a printer/processor for performing printing processes on both piece negatives taken out of a negative sheet and an elongate negative film.

2. Description of the Related Art

Generally, a negative film used in taking pictures with a camera is brought to a photo processing agent for simultaneous printing. At a developing laboratory, the negative film is developed and image frames rendered visible are printed on printing paper. The prints and the developed negative film are handed over from the photo processing agent to the customer. Prior to this, the negative film is cut into piece negatives each having four or six frames, and individual piece negatives are put into separate pocket-like holders formed between the front and back sheets of a negative sheet. When ordering additional prints, the customer fills in a predetermined form with reorder information such as positions of the image frames to be printed and the numbers of prints required, and brings the negative sheet containing the piece negatives along with the filled form to the photo processing agent. The photo processing agent sends the reorder information and the negative sheet received from this customer to the developing laboratory. An operator at the laboratory takes the piece negatives to be printed out of the negative sheet, and sets the piece negatives to a loading section of a printer/processor to carry out a required printing process. Subsequently, the piece negatives are discharged from the printer/processor, and operator inserts the piece negatives back into the negative sheet. This additional printing (reorder) process is performed as an interrupt process to suspend a simultaneous printing process on an elongate negative film wound on a film reel. The reorder process is a troublesome operation requiring manual handling of the piece negatives by the operator to take the piece negatives out of the negative sheet to be used for additional prints, and to put the piece negatives back into the negative sheet. Thus, the larger number of reorder processes results in the lower operating rate of the printer/processor.

SUMMARY OF THE INVENTION

The object of this invention is to provide a printer/processor for automatically and efficiently performing a simultaneous printing process using an elongate negative film and an additional printing process (reorder process) using piece negatives.

The above object is fulfilled, according to this invention, by a printer/processor comprising a negative sheet loader for receiving a negative sheet containing piece negatives, a handling device for drawing the piece negatives out of the negative sheet, an elongate negative film inlet for receiving an elongate negative film, a transport line extending to an exposing section, and a branching device selectively movable between a first position to form a passage for connecting the handling device and the transport line, and a second position to form a passage for connecting the elongate negative film inlet and the transport line.

In the above construction, the branching device is set to the first position when performing an additional printing process on a piece negative drawn out of the negative sheet by the handling device. Then, the piece negative drawn out is fed to the transport line through a passage in the branching device to be printed at the exposing section. On the other hand, when performing a simultaneous printing process on an elongate negative film, the branching device is set to the second position. The elongate negative film introduced through the elongate negative film inlet is fed to the transport line through a passage in the branching device to be printed at the exposing section. Thus, the branching device is switchable to selectively form a line for feeding the elongate negative film from a film reel or a line for feeding the piece negatives from the negative sheet. Only by inserting the negative sheet into the negative sheet loader, the simultaneous printing process is interrupted by an additional printing process in a timely way and efficiently. This contributes to a reduction in the burden on the operator in performing a reorder process.

In a preferred embodiment of this invention, the negative sheet further contains a reorder card having reorder information recorded thereon, the branching device in the second position forming a shunt passage for receiving the reorder card drawn out by the handling device. In this construction, the branching device forms a transport line necessary for reading the reorder information recorded on the reorder card. There is no need to provide a separate branching mechanism for the reorder card. In this embodiment, the branching device may include, formed independently of one another, a first branch passage for connecting the handling device and the transport line, a second branch passage for connecting the elongate negative film inlet and the transport line, and a third branch passage having one end thereof connected to the handling device and the other end opened. Then, while the second branch passage is used in time of simultaneous printing, the third branch passage is used for an operation to read the reorder information from the reorder card. This contributes to a reduced time taken in transition from the simultaneous printing process to the additional printing process.

As a preferred form of the branching device according to this invention, it is proposed that the branching device includes a cylindrical drum defining the three branch passages, and a drive device for rotating the cylindrical drum about an axis thereof. By employing the cylindrical drum, the first position and second position may be produced only with a change in the angle of rotation, which simplifies position controls. In this case, the first branch passage may extend straight, and the second and third branch passages may be curved. Then, the second branch passage is used to change a direction of the elongate negative film fed from the film reel which usually is disposed above the transport line to the exposing section. The piece negative stored in straight form in the negative sheet and the transport line to the exposing section are arranged on a straight line through the first branch passage. The curved, third branch passage provides a further advantage that the open end of the third branch passage in the second position does not interfere with the transport line to the exposing section.

Other features and advantages of this invention will be apparent from the following description of the embodiment to be taken with reference to the drawings.

DESCRIPTION OF THE PREFERRED EMBODIMENT

Figure 1:
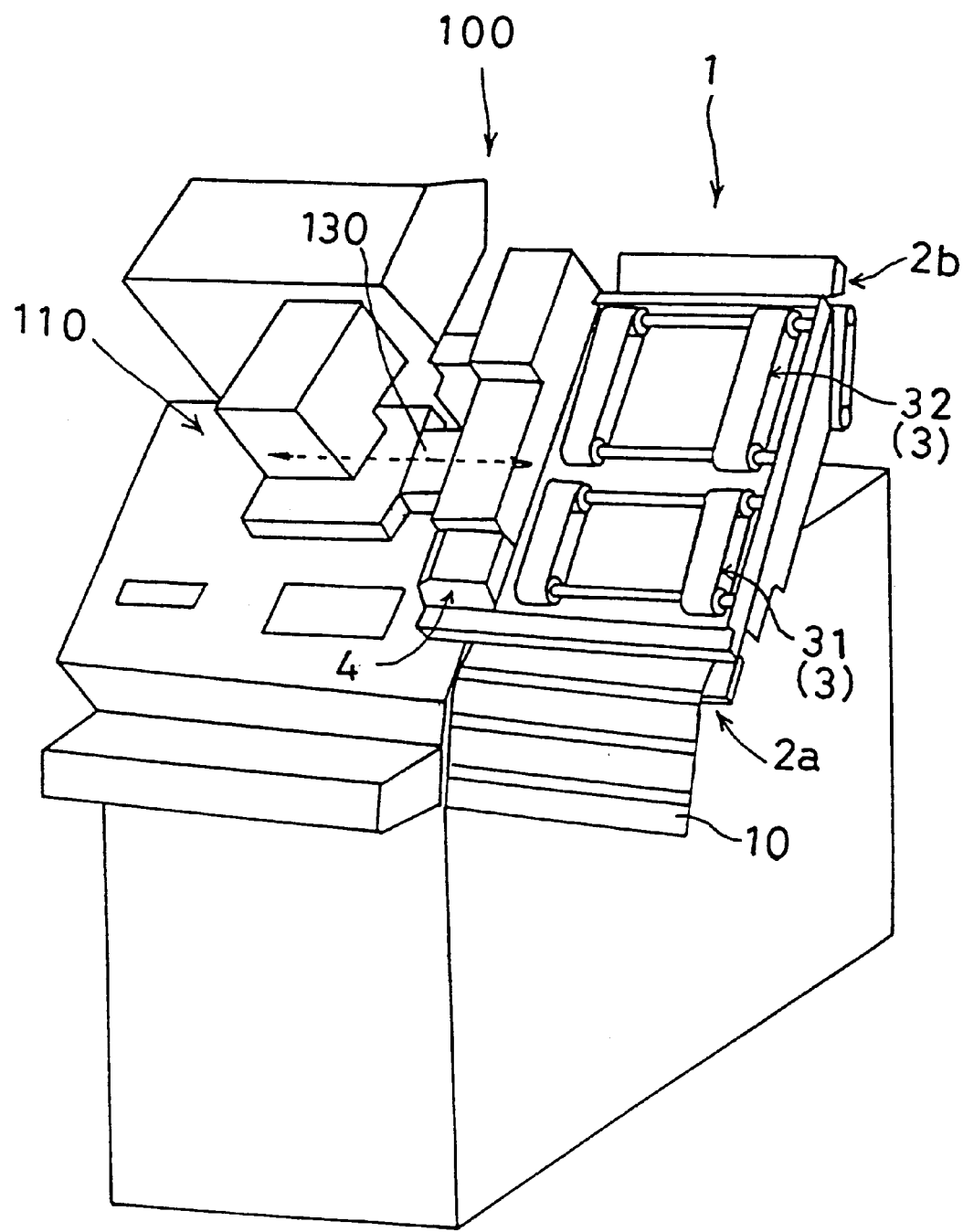
FIG. 1 is a perspective view of a printer/processor according to this invention.

FIG. 1 shows a printer/processor 100 having a reorder processing function according to this invention. The printer/processor 100 includes an exposing section 110 disposed on a front portion thereof, and a reorder processing unit 1 disposed to a side of the exposing section 110 for drawing piece negatives NP out of a negative sheet 10 and transmitting them to the exposing section 110 to make additional prints. As seen from FIG. 2, the printer/processor 100 further includes a developing section 120 disposed in the rear thereof for developing printing paper FP exposed in the exposing section 110.

Figure 3:
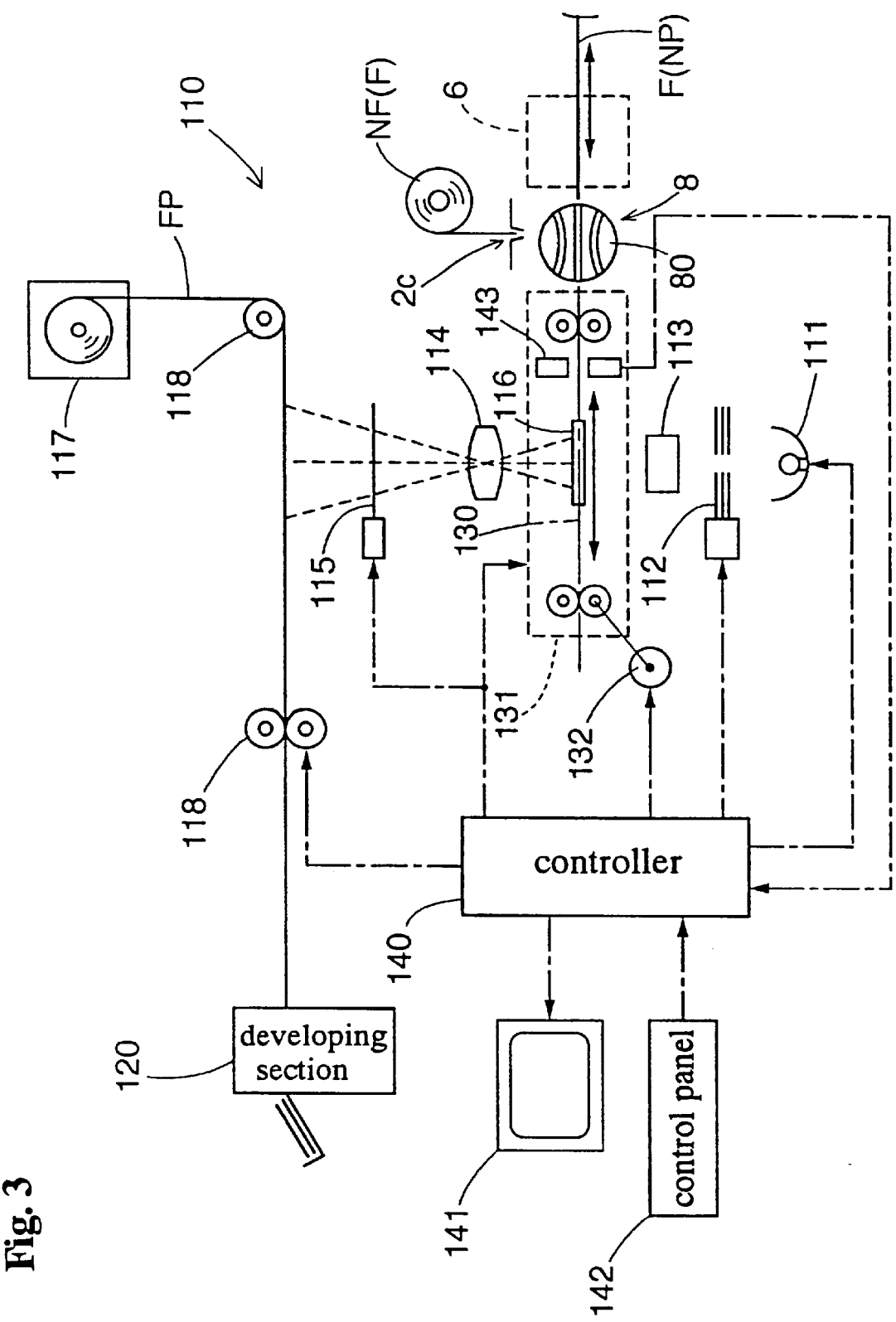
FIG. 3 is a block diagram of the printer/processor shown in FIG. 1.

The exposing section 110 will be described first with reference to the block diagram shown in FIG. 3.

The exposing section 110 includes, arranged adjacent an exposure point, an exposing light source 111, a light adjustment filter 112 for adjusting a color balance of irradiating light emitted from the exposing light source 111, with yellow, magenta and cyan filters movable into and out of an exposing optical path, a mirror tunnel 113 for uniformly mixing the colors of the light after the color balance adjustment through the light adjustment filter 112, a printing lens 114 for forming images of film frames to be printed on the printing paper FP, a shutter 115, an auto negative mask 116, and transport rollers 118 for transporting the printing paper FP from a paper magazine 117. Positions of the filters of the light adjustment filter 112, and an opening time of the shutter 115, i.e. an exposure time, are controlled according to exposing conditions determined by a controller 140. The operator of the printer/processor 100 may observe images displayed on a monitor 141, and input instructions to correct the exposing conditions through a control panel 142 unless proper images are obtained. Then, the controller 140 corrects the exposing conditions based on the correcting instructions and determines final exposing conditions. Based on the exposing conditions determined in this way, the controller 140 controls operations of the respective components of the exposing section 110 to project and expose the images on the printing paper FP drawn from the paper magazine 117.

The images printed on the printing paper FP, usually, are those of image frames on an elongate negative film NF in time of simultaneous printing, and those of image frames on cut piece negatives NP, each having four or six frames, in time of additional printing. Where the elongate negative film NF and piece negatives NP need not be distinguished, these films will be referred to collectively hereinafter as films F. A transport line 130 for transporting films F to the exposure point is defined by a film transport mechanism 131. A scanner 143 is disposed on the film transport line 130 for reading the frame images from films F. The images read are transmitted to the controller 140 for use in determining exposing conditions and for display on the monitor 141. Further, the controller 140 controls the film transport mechanism 131 by driving a transport motor 132.

Figure 2:
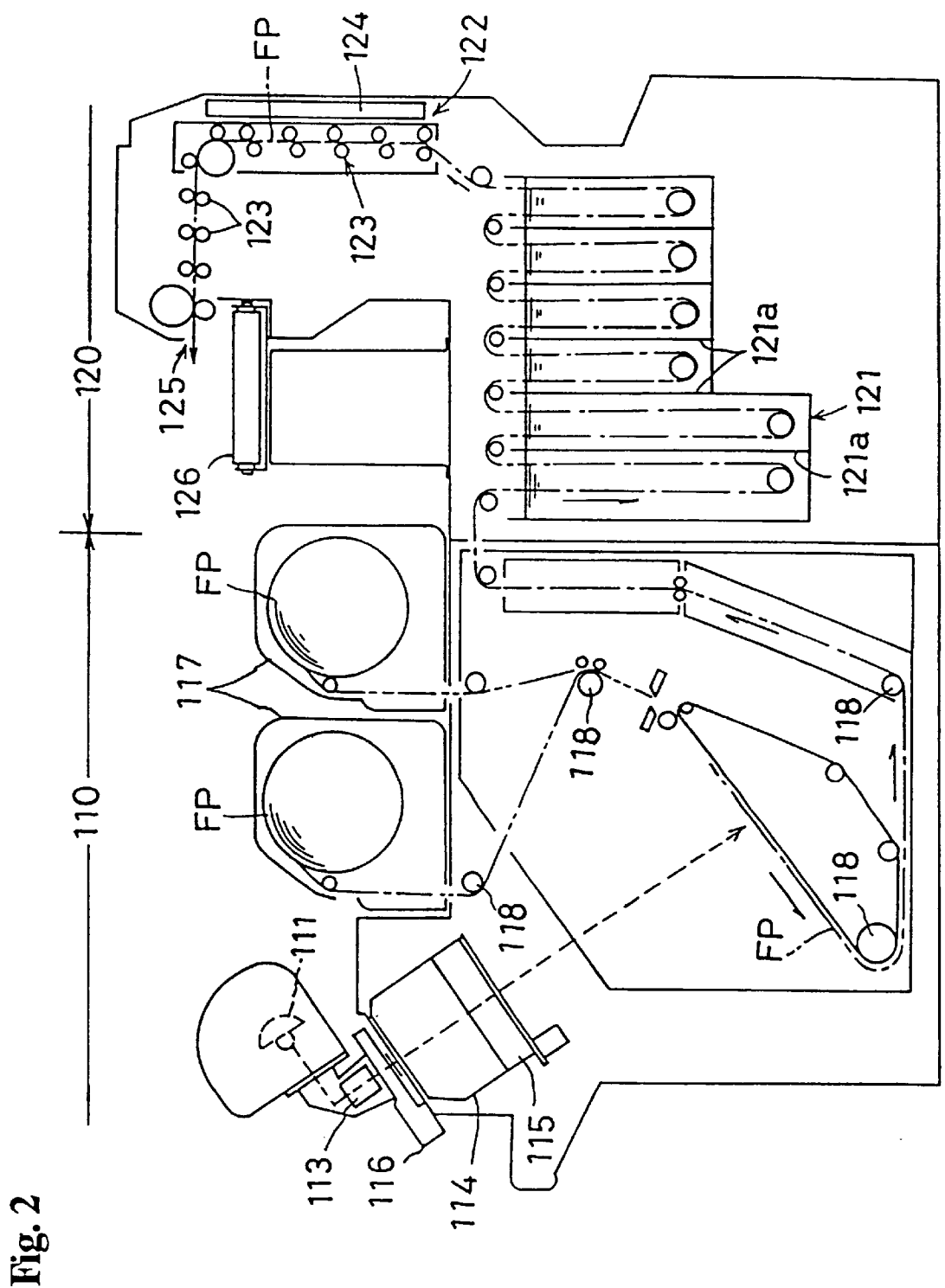
FIG. 2 is a schematic sectional view of the printer/processor shown in FIG. 1.

As shown in detail in FIG. 2, exposed printing paper FP is transported in a direction indicated by arrows to the developing section 120 by numerous transport rollers 118. The developing section 120 includes a developing tank 121 storing developers, a drying section 122 and a printing paper outlet 125 arranged along the direction of transport of the printing paper FP.

The developing tank 121 has an interior thereof divided by partition plates 121a into a number of compartments filled with different types of developing solutions necessary for the developing process. The printing paper FP is transported successively through the respective compartments to be developed.

The drying section 122 includes a pinching transport roller mechanism 123 having numerous opposed roller pairs arranged along the direction of transport, and a heater 124 disposed on one side of a transport line defined by the pinching transport roller mechanism 123. The printing paper FP is appropriately dried while advancing along the transport line. The printing paper FP exiting the drying section 122 moves through the printing paper outlet 125 to be placed on a transverse transport conveyer 126 and forwarded to a sorter not shown.

The negative sheet 10 handled by the reorder processing unit 1 will be described next with reference to FIGS. 4 and 5. The negative sheet 10 has a front sheet 11 and a back sheet 12 formed by folding a sheet of transparent resin film. The front sheet 11 and back sheet 12 are bonded together along joining lines 15 arranged at fixed intervals to form pockets 13 between the joining lines 15 for containing piece negatives NP. Thus, openings 14 of the pockets 13 are defined by a free end 11a of front sheet 11 and a free end 12a of back sheet 12. The joining lines 15 stop short of the free end 11a of front sheet 11 and the free end 12a of back sheet 12. Consequently, the free end 11a of front sheet 11 is independent of the free end 12a of back sheet 12 substantially over the vertical length of the negative sheet 10. In this embodiment, the uppermost pocket 13 of the negative sheet 10 contains a mark sheet type reorder card OC having reorder information recorded thereon, such as positions of the frames to be additionally printed and the numbers of prints to be made of the piece negatives NP stored in the negative sheet 10. The reorder card OC has substantially the same shape as the piece negatives NP to be handled by the reorder processing unit 1 in a similar way to the piece negatives NP.

Figure 6:
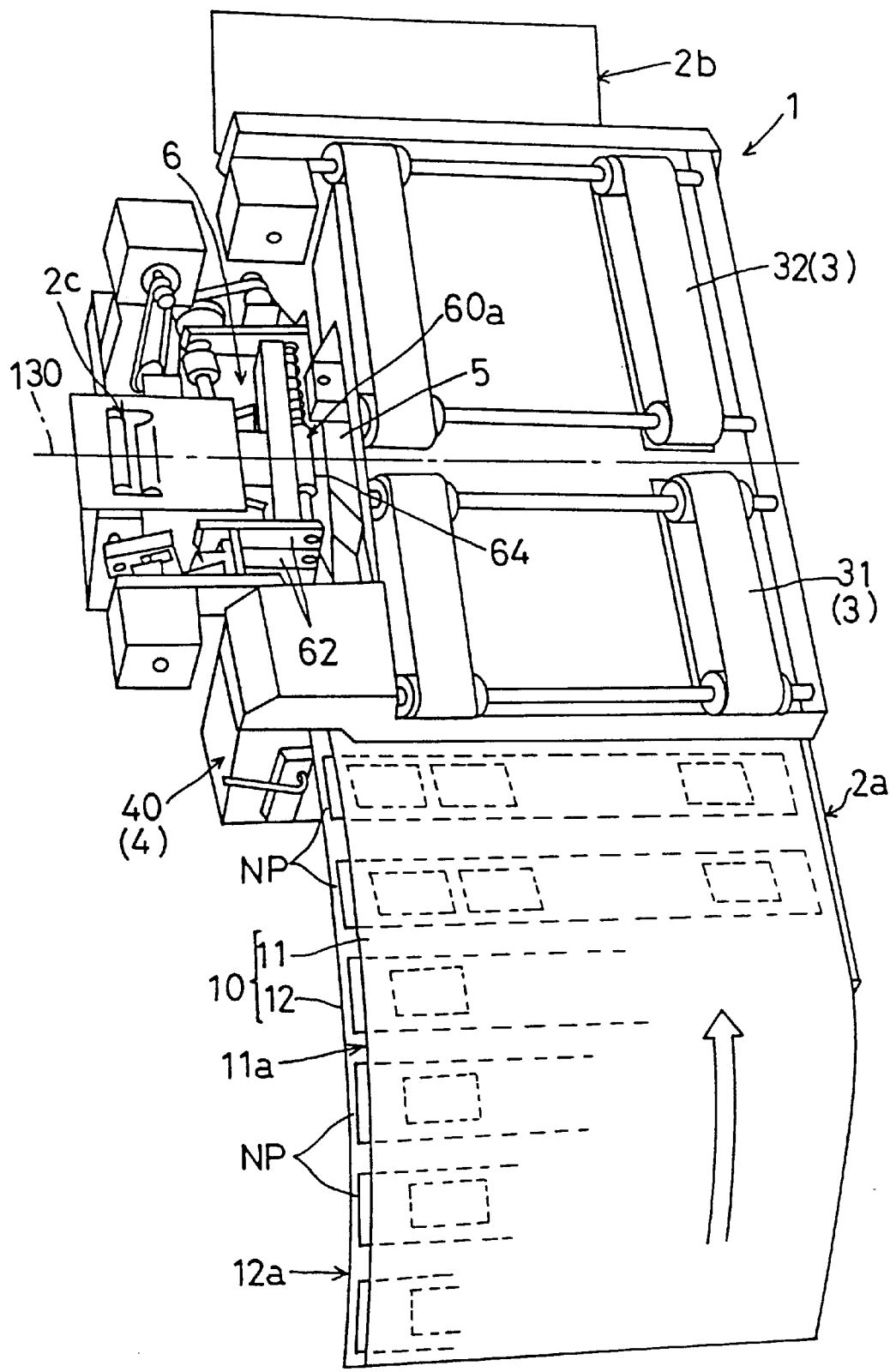
FIG. 6 is a perspective view of a reorder processing unit.

As shown in FIG. 6, the reorder processing unit 1 includes a negative sheet loader 2a for receiving the negative sheet 10 containing piece negatives NP to be printed, an outlet 2b for outputting the negative sheet 10 containing the piece negatives NP having undergone a printing process, and a transport mechanism 3 for transporting the negative sheet 10 from the negative sheet loader 2a to the outlet 2b. Further, as seen from FIG. 6, an opening device 4 is disposed adjacent the negative sheet loader 2a for widening the openings 14 of the pockets 13 of negative sheet 10. A guide 5 extends in a direction of transport of the negative sheet 10 to a position beyond the transport line 130 extending to the exposing section 110 to maintain, as they are, the free end 11a of front sheet 11 and the free end 12a of back sheet 12 widened by the opening device 4.

Figure 7:
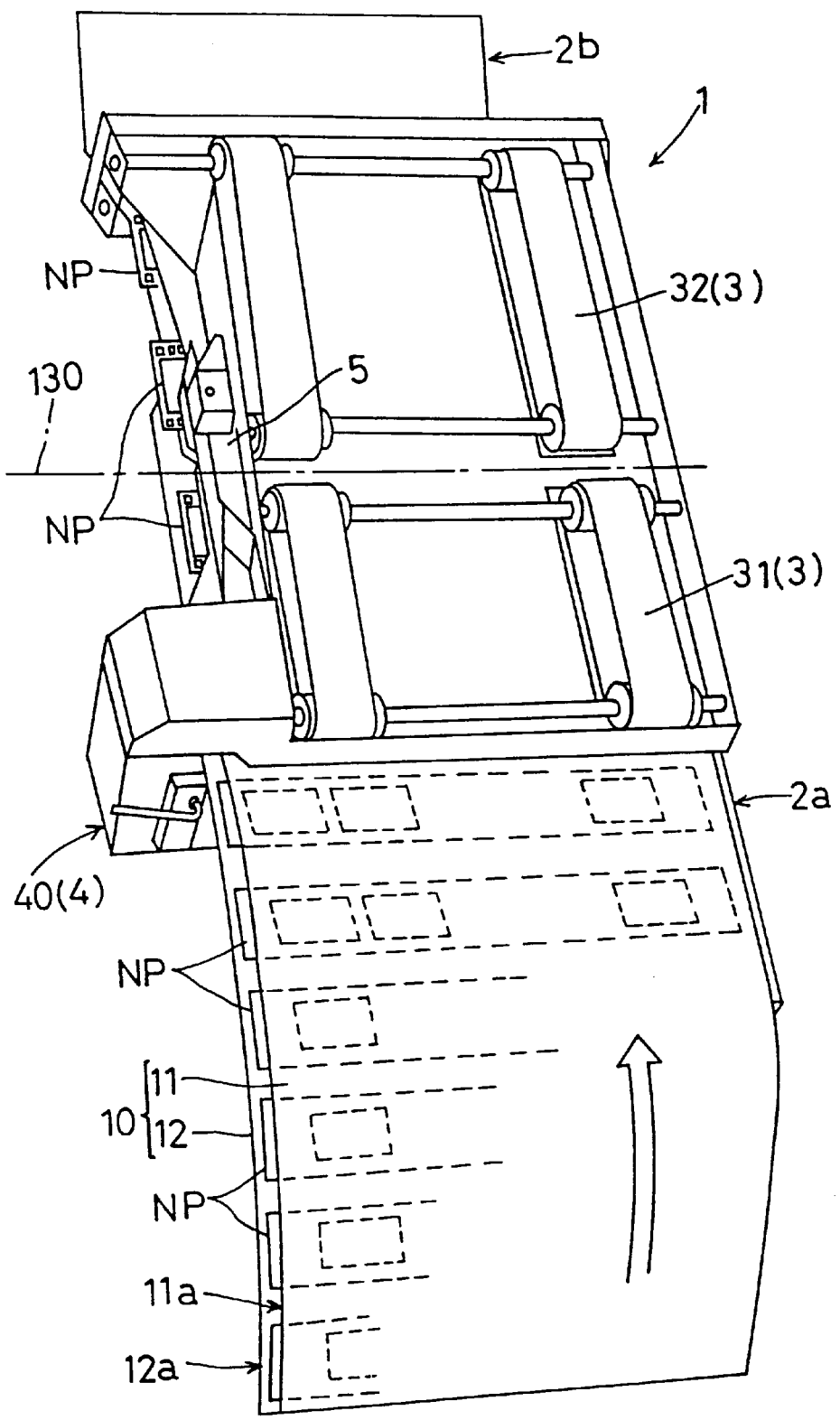
FIG. 7 is a perspective view of the reorder processing unit with a piece negative having reached a transport line.

The transport line 130 to the exposing section 110 includes, arranged thereon, a handling device 6 for drawing out the piece negatives NP exposed from the widened openings 14 (see FIG. 7), and transferring the piece negatives NP to the film transport mechanism 131, and an elongate negative film inlet 2c for inserting an elongate negative film NF for use in simultaneous printing. A branching device 8 (see FIG. 16) is disposed below the elongate negative film inlet 2c for switching between a position to form a line for transmitting the negative film NF to the exposing section 110, and a position to form a line for transmitting the piece negatives NP to the exposing section 110.

The transport mechanism 3 includes a first belt transport section 31 disposed upstream, and a second belt transport section 32 disposed downstream, of the transport line 130 with respect to the direction of transport of negative sheet 10. The first and second belt transport sections 31 and 32 employ a pinching transport mode for transporting the negative sheet 10 by pinching it at the front and back thereof. The belts for supporting the back of negative sheet 10 are omitted from the drawings. The negative sheet 10 is released from the first and second belt transport sections 31 and 32 on the transport line 130 in order to allow the piece negatives NP to be drawn out of and returned to the pockets 13 smoothly.

Figure 8:
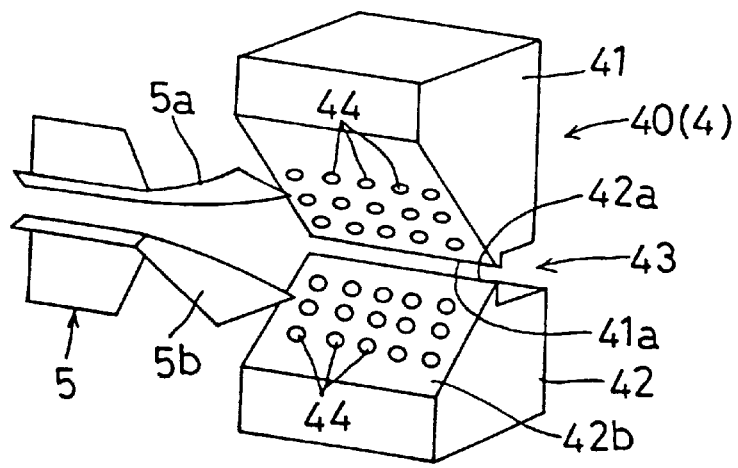
FIG. 8 is a schematic perspective view of a suction device.

In this embodiment, the opening device 4 is in the form of an air suction device 40. Its operating principle will be described with reference to FIG. 8. This suction device 40 includes a front sheet sucking section 41 and a back sheet sucking section 42. A passage 43 is formed between a lower end of front sheet sucking section 41 and an upper end of back sheet sucking section 42 for allowing passage of the negative sheet 10. The front sheet sucking section 41 has a knife edge 41a formed on part of the lower end thereof and extending in the direction of transport of the negative sheet 10. The back sheet sucking section 42 also has a knife edge 42a formed on part of the upper end thereof and opposed to the knife edge 41a of front sheet sucking section 41. Further, the front sheet sucking section 41 defines an inclined surface 41b extending upward and forward from the knife edge 41a. The back sheet sucking section 42 defines an inclined surface 42b extending downward and forward from the knife edge 42a. The two inclined surfaces 41b and 42b include numerous suction bores 44 connected to a suction pump or suction fan not shown in FIG. 8. The suction pump or suction fan is operable to suck air from around the inclined surfaces 41b and 42b to form negative pressure areas.

Figure 9:
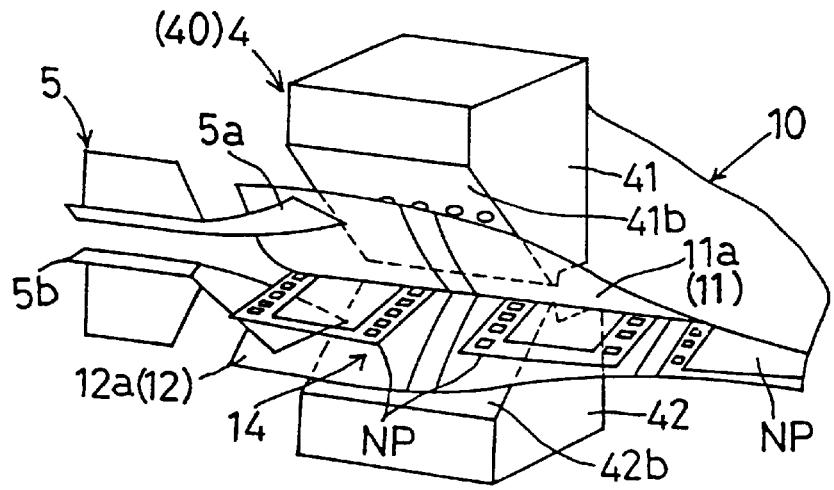
FIG. 9 is a schematic perspective view of the suction device with the negative sheet opened.

When the negative sheet 10 is transported through the passage 43 with air sucked through the suction bores 44, as shown in FIG. 9, the front sheet free end 11a of negative sheet 10 is drawn to the inclined surface 41b of front sheet sucking section 41, and the back sheet free end 12a to the inclined surface 42b of back sheet sucking section 42. However, the piece negatives NP retain a straight posture since the negative pressure hardly acts thereon and since the piece negatives NP per se have a relatively high degree of rigidity. At this time, the knife edges 41a and 42a buckle the front sheet 11 and back sheet 12 drawn, to spread apart the front sheet 11 and back sheet 12 reliably. This step of bending the two sheets 11 and 12 may be carried out while transporting the negative sheet 10 or after temporarily stopping the negative sheet 10.

The guide 5 is disposed downstream of the suction device 40 with respect to the direction of transport of negative sheet 10 to maintain the front sheet 11 and back sheet 12 as spread apart by the opening device 4, despite the transport of negative sheet 10. The guide 5 includes a guide plate 5a for guiding the front sheet 11, and a guide plate 5b for guiding the back sheet 12. The guide 5 extends beyond the transport line 130, and the postures of the front sheet 11 and back sheet 12 spread apart by the suction device 40 are maintained beyond the transport line 130. Consequently, the openings 14 of pockets 13 remain wide open upon arrival at the transport line 130.

Figure 10:
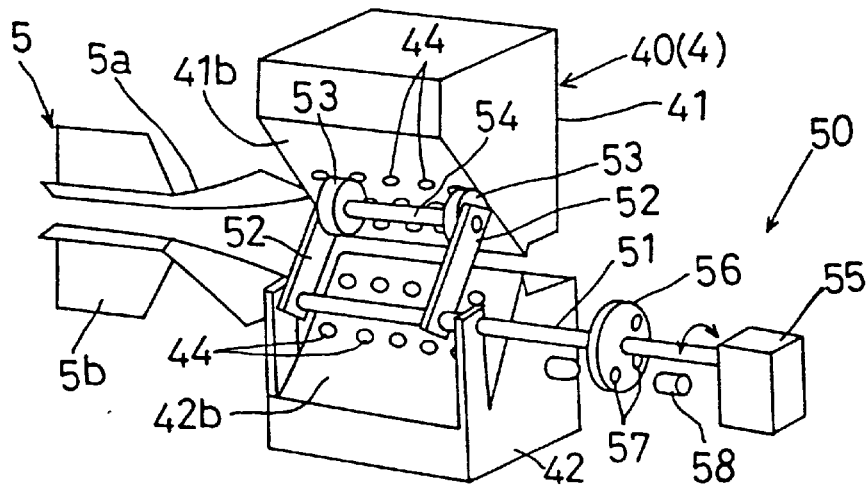
FIG. 10 is a schematic perspective view of the suction device including swing arms.

The above construction is adequate if the front sheet 11 and back sheet 12 are spread apart only by the suction of the suction device 40. However, this embodiment additionally provides an arm mechanism 50 as shown in FIG. 10, in order to cause the front sheet 11 and back sheet 12 to be drawn to the respective inclined surfaces 41b and 42b reliably.

The arm mechanism 50 includes a swing shaft 51 extending in the direction of transport of negative sheet 10, swing arms 52 fixed to the swing shaft 51 and extending radially thereof, and presser rollers 53 mounted at distal ends of the swing arms 52, respectively. As shown in FIG. 10, two pairs of swing arms 52 and presser rollers 53 are provided and interconnected through a connecting rod 54. Only one presser roller or three or more presser rollers may be provided as necessary.

As shown in FIGS. 11A through 11D, the arm mechanism 50 is swingable between a lower position in which the presser rollers 53 press the back sheet 12 of negative sheet 10 against the inclined surface 42b of back sheet sucking section 42, and an upper position in which the presser rollers 53 press the front sheet 11 of negative sheet 10 against the inclined surface 41b of front sheet sucking section 41. For this purpose, this embodiment provides a motor 55 for rotating the swing shaft 51, a positioning disk 56 fixed to the swing shaft 51, and an optical sensor 58 for detecting positioning bores 57 formed in the positioning disk 56. The controller 140 uses a detection signal from the optical sensor 58 to control the motor 55 as follows.

Figure 11:
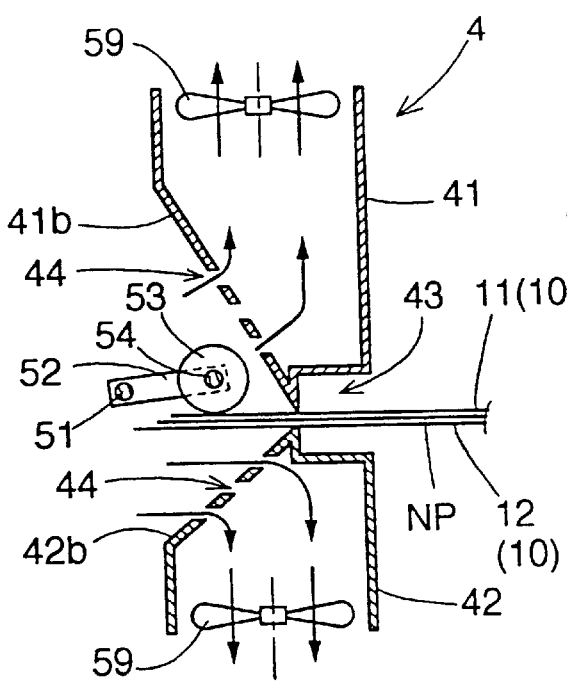
FIGS. 11A through 11D are explanatory views of operation of the suction device shown in FIG. 10.
Figure 11:
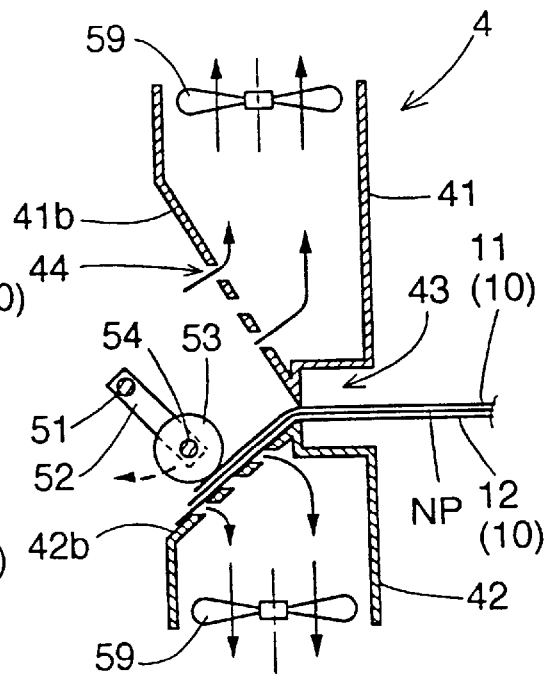
Figure 11:
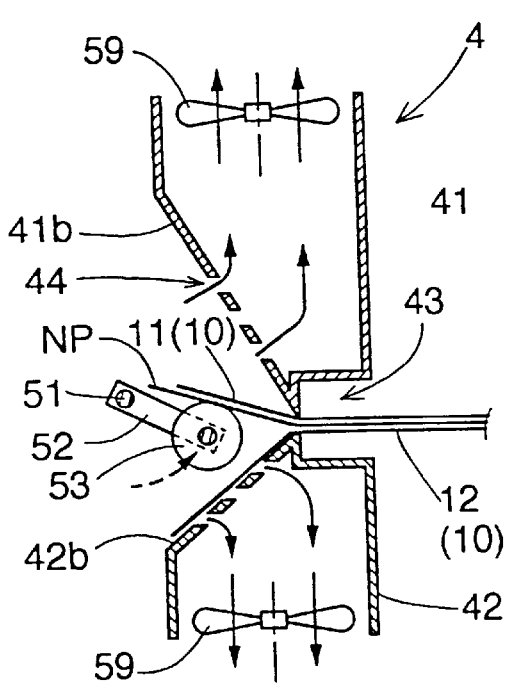
Figure 11:
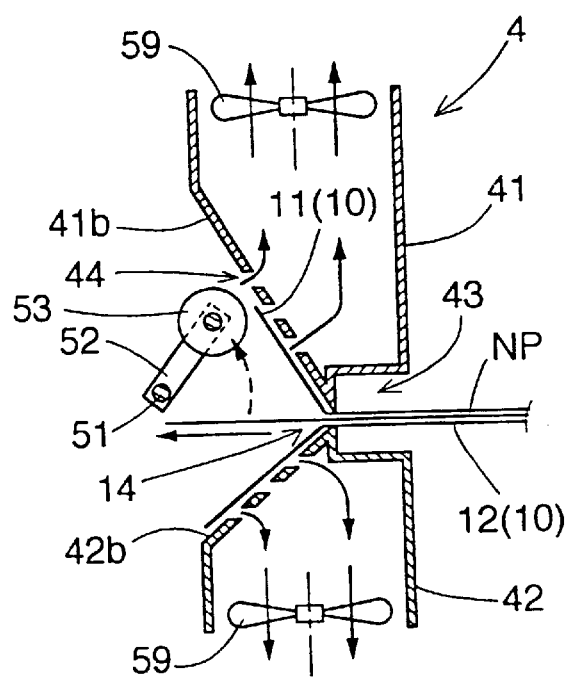

When the negative sheet 10 enters the passage 43 of suction device 40 (FIG. 11A), the swing arms 52 are swung downward to press the back sheet 12 against the inclined surface 42b of back sheet sucking section 42 (FIG. 11B). As the swing arms 52 are swung further downward, the presser rollers 53 move out of contact with the negative sheet 10. The back sheet 12 once pressed against the inclined surface 42b remains drawn by a suction fan 59 acting through the suction bores 44. However, the highly elastic piece negatives NP return to the straight posture by their self-restoring force. The front sheet 11 is returned to the straight posture by the piece negatives NP. When the swing arms 52 begin to swing upward next, the piece negatives NP and front sheet 11 are moved toward the inclined surface 41b of front sheet sucking section 41 (FIG. 11C). With a further upward swing of the swing arms 52 to move the presser rollers 53 out of contact with the piece negatives NP, the front sheet 11 remains drawn to the inclined surface 41b of front sheet sucking section 41, but the piece negatives NP return to the straight posture by the self-restoring force (FIG. 11D). For effecting the series of swings of the arm mechanism 50, the positioning bores 57 are disposed in positions corresponding to an upper limit and a lower limit where the presser rollers 53 disengage from the negative pieces NP. The illustrated arm mechanism 40 is a swing arm type mechanism in this embodiment, but may employ a different type mechanism such as a link mechanism for bending the negative sheet 10 downward and upward.

Through the above sequence, the openings 14 of negative sheet 10 are fully opened to expose forward ends of piece negatives NP. As the negative sheet 10 is transported in this state, the front sheet 11 and back sheet 12 drawn to the inclined surfaces 41b and 42b shift therealong to a region to be supported by the guide plates 5a and 5b. The opened state is maintained until the piece negatives NP reach the transport line 130.

The handling device 6 for drawing the piece negatives NP out of the negative sheet 10 and returning the piece negatives NP into the negative sheet 10 will be described next.

Figure 12:
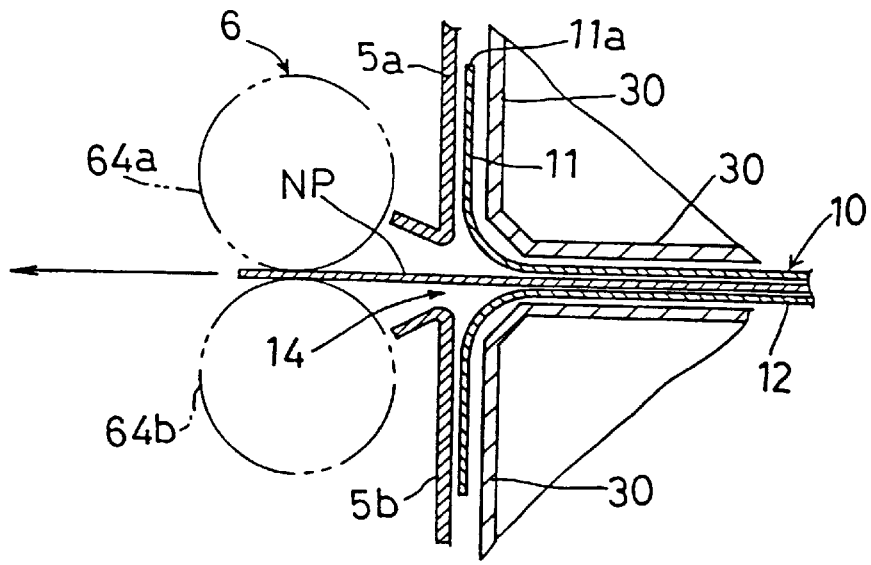
FIG. 12 is a sectional view of a front sheet and a back sheet spread apart on the transport line.

FIG. 12 shows a sectional view of a piece negative NP having reached the transport line 130 as exposed from the opening 14 widened by the opening device 4. As seen, the front sheet 11 of negative sheet 10 is placed between the upper guide plate 5a and a frame 30 of the transport mechanism 3, while the back sheet 12 is placed between the lower guide plate 5b and a frame 30 of the transport mechanism 3. The forward end of piece negative NP projects into a region of the handling device 6.

Figure 13:
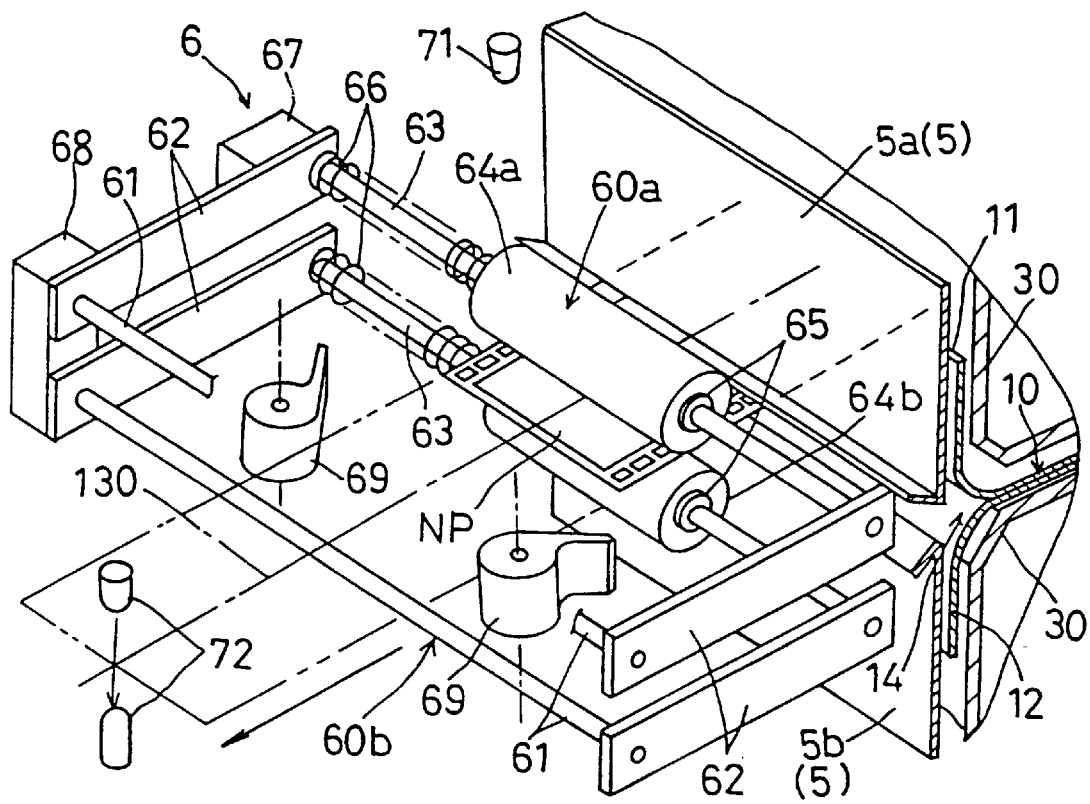
FIG. 13 is a schematic perspective view of a handling device.

As shown in FIG. 13, the handling device 6 includes a first and a second swing roller units 60a and 60b opposed to the front and back surfaces of piece negative NP moving along the transport line 130, respectively. The first swing roller unit 60a includes a swing shaft 61 extending in the direction of transport of negative sheet 10, two support plates 62 fixed to the swing shaft 61, a roller support shaft 63 interconnecting distal ends of the two support plates 62, and a drive roller 64a movable axially of the roller support shaft 63 and locked against rotation by a key not shown. Further, the roller support shaft 63 has an E-ring 65 acting as a stopper to axial displacement of the drive roller 64a, a coil spring 66 for biasing the drive roller 64a to the E-ring 65 to position the drive roller 64a on the transport line 130. Numeral 67 denotes a motor for rotating the roller support shaft 63, and thus the drive roller 64a, based on a control command from the controller 140.

The second swing roller unit 60b has the same basic construction as the first swing roller unit 60a, excepting that a driven roller 64b is mounted on a roller support shaft 63 to be axially movable and rotatable relative thereto. Like reference numerals are used to identify like parts and will not be described again.

The first swing roller unit 60a and second swing roller unit 60b are swingable in an interlocked relationship by a drive unit 68 between a first position in which the rollers 64a and 64b pinch the piece negative NP therebetween, and a second position for releasing the piece negative NP. A control command for this drive unit 68 also is provided by the controller 140.

After the drive roller 64a and driven roller 64b pinch the forward end of piece negative NP exposed from the opening 14 located on the transport line 130, the drive roller 64a is rotated to draw out the pinched piece negative NP. The piece negative NP drawn out of the pocket 13 has a centerline thereof aligned to the transport line 130 by width guides 69 arranged at opposite sides. The width guides 69 will not particularly be described. As seen from FIG. 13, these are pivotal pawl guides pivotable about vertical axes by motors not shown, to forcibly correct a displacement of piece negative NP from the transport line 130. Of course, the width guides 69 may be constructed by employing varied well-known guide techniques.

The piece negative NP processed at and returned from the exposing section 110 is accurately aligned to the transport line 130 by the guide of the film transport mechanism 131. However, the pocket 13 of negative sheet 10 waiting to receive the piece negative NP is not necessarily aligned to the transport line 130. Thus, the reorder processing unit 1 has a function to align the pocket 13 of the negative sheet to the transport line 130 accurately. This function will be described with reference to FIGS. 14A through 14C.

Figure 14:
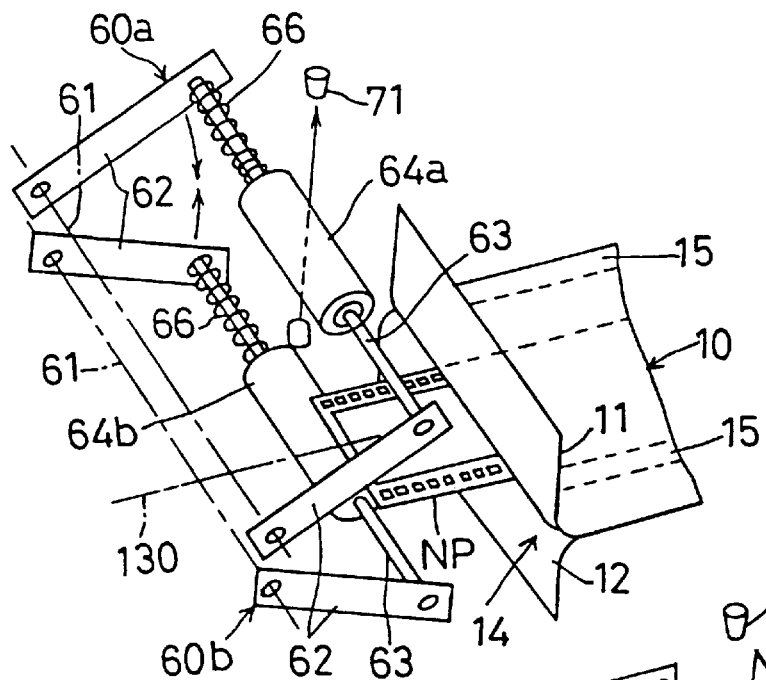
FIGS. 14A through 14C are explanatory views of operation of the handling device.
Figure 14:
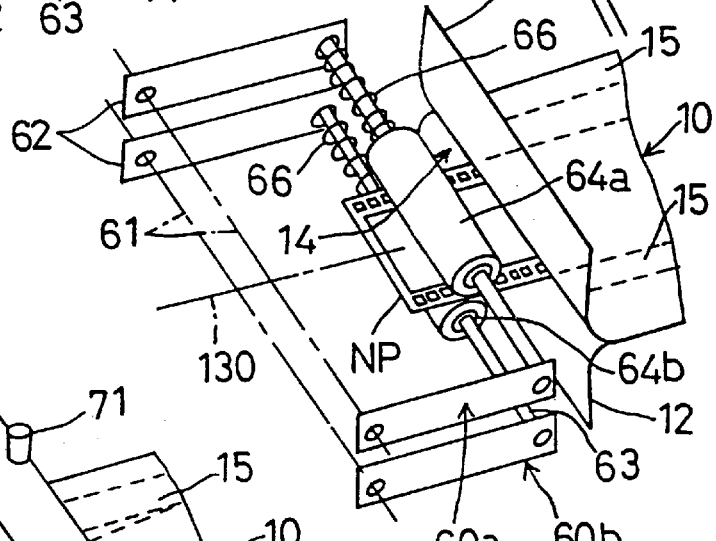
Figure 14:
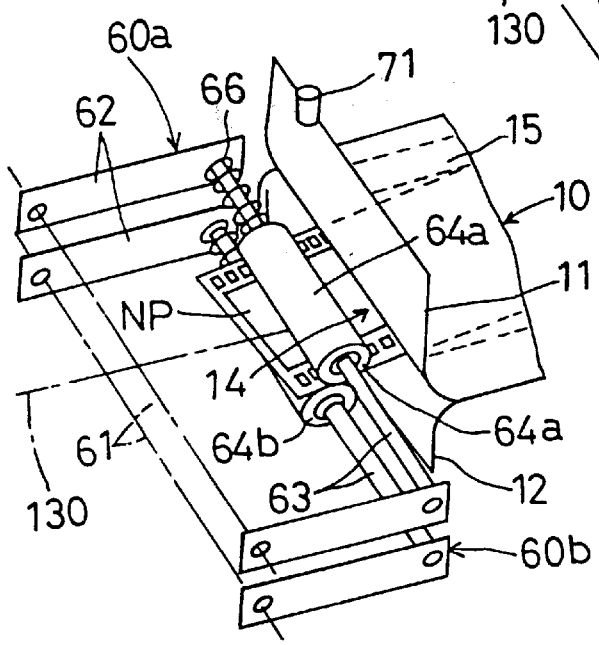

A piece negative NP to be printed reaches the transport line 130 where the handling device 6 in an open state is waiting (FIG. 14A). Then, the transport of negative sheet 10 is stopped and the forward end of piece negative NP is pinched between the drive roller 64a and driven roller 64b. Subsequently, the transport mechanism 3 transports the negative sheet 10 further on (FIG. 14B). The negative sheet 10 moves by an amount corresponding to an extra space in the pocket 13 available to the piece negative NP, whereby the piece negative NP contacts a joining line 15. Then, the negative sheet 10 and piece negative NP move the drive roller 64a and driven roller 64b axially against the biasing force of coil springs 66. The movement of negative sheet 10 is stopped when a piece negative detecting sensor 71 detects a side edge of moving piece negative NP. The piece negative detecting sensor 71 is disposed in a position with a predetermined spacing from the transport line 130. The width of piece negative NP is known. It is thus possible to compute the position with respect to the transport line 130 of the joining line 15 of the pocket 13 containing the piece negative NP to be processed. The drive roller 64a and driven roller 64b have a weak pinching force. Therefore, when the drive roller 64a and driven roller 64b are actually moved by the piece negative NP, the piece negative NP assumes an oblique posture (FIG. 14C).

Figure 15:
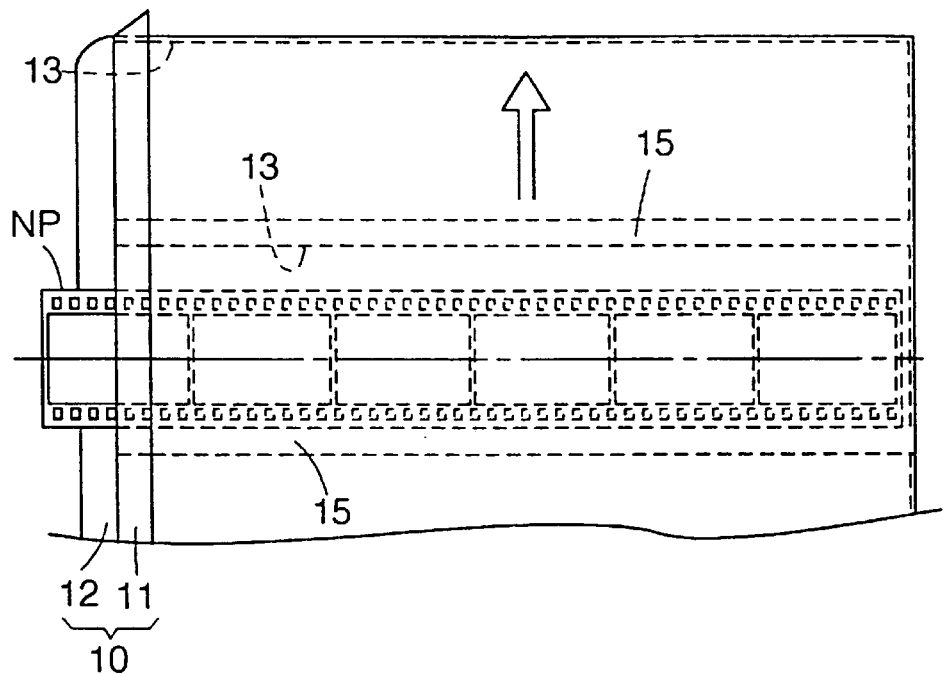
FIGS. 15A and 15B are explanatory views of a relationship between a piece negative and joint lines in time of drawing out the piece negative.
Figure 15:
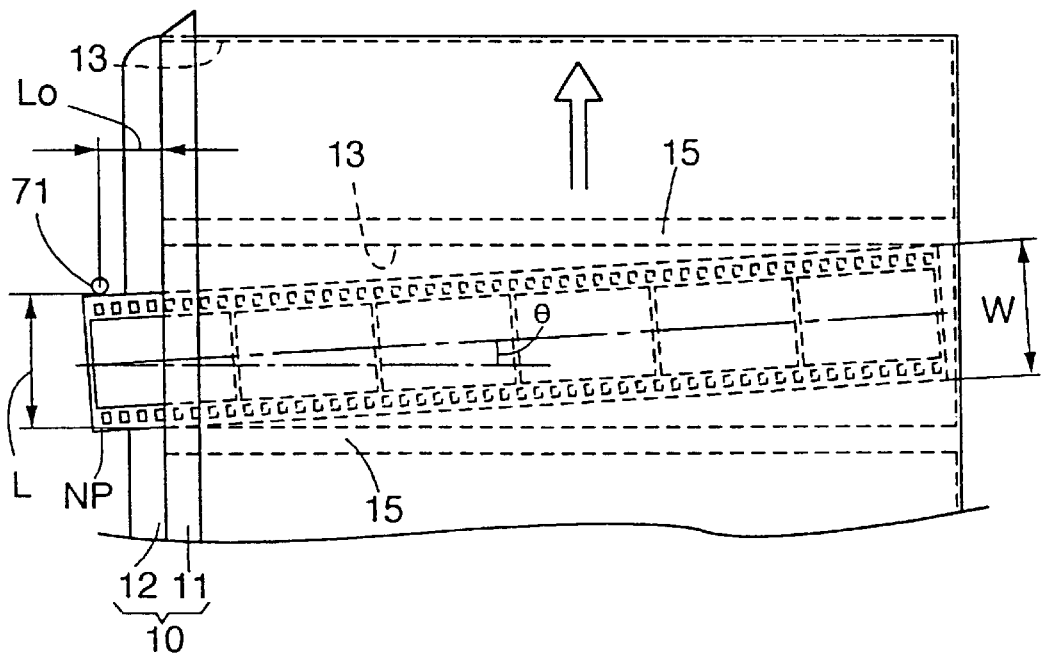

That is, in an actual situation, the piece negative NP in the pocket 13 is not parallel to the joining lines 15 as shown in FIG. 15A, but lies at an angle to the joining lines 15 as shown in FIG. 15B. The length of piece negative NP is needed for correcting the position of joining line 15 due to the tilt of the piece negative NP. Thus, an optical sensor 72 is disposed adjacent the handling device 6 for detecting the length of piece negative NP (see FIG. 13). A correcting operation will particularly be described with reference to FIG. 15B. Assume that the piece negative NP is at an angle $\theta$ to the joining line 15, that the piece negative NP has a width W, and that the piece negative detecting sensor 71 is at distance Lo to the end of the joining line 15. Then, distance: L from the piece negative detecting sensor 71 to the joining line 15 in the direction of transport of negative sheet 10 is derived from the following equation:

$$L = W/\cos\theta = L_o * \tan\theta$$

Since the position of piece negative detecting sensor 71 is known, the position of joining line 15 can be determined. Based on this result, the negative sheet is moved to align the center of pocket 13 to the transport line 130. When it is guaranteed that the piece negative NP in the pocket 13 is parallel to the joining lines 15 as shown in FIG. 15A, the correction based on the above equation is of course unnecessary since distance: L from the piece negative detecting sensor 71 to the joining line 15 in the direction of transport of negative sheet 10 equals width: W of piece negative NP.

The branching device 8 will be described next with reference to FIGS. 16, 17A and 17B. As noted hereinbefore, the branching device 8 is operable to switch between the line for transmitting the negative films NF to the exposing section 110 and the line for transmitting the piece negatives NP to the exposing section 110.

Figure 16:
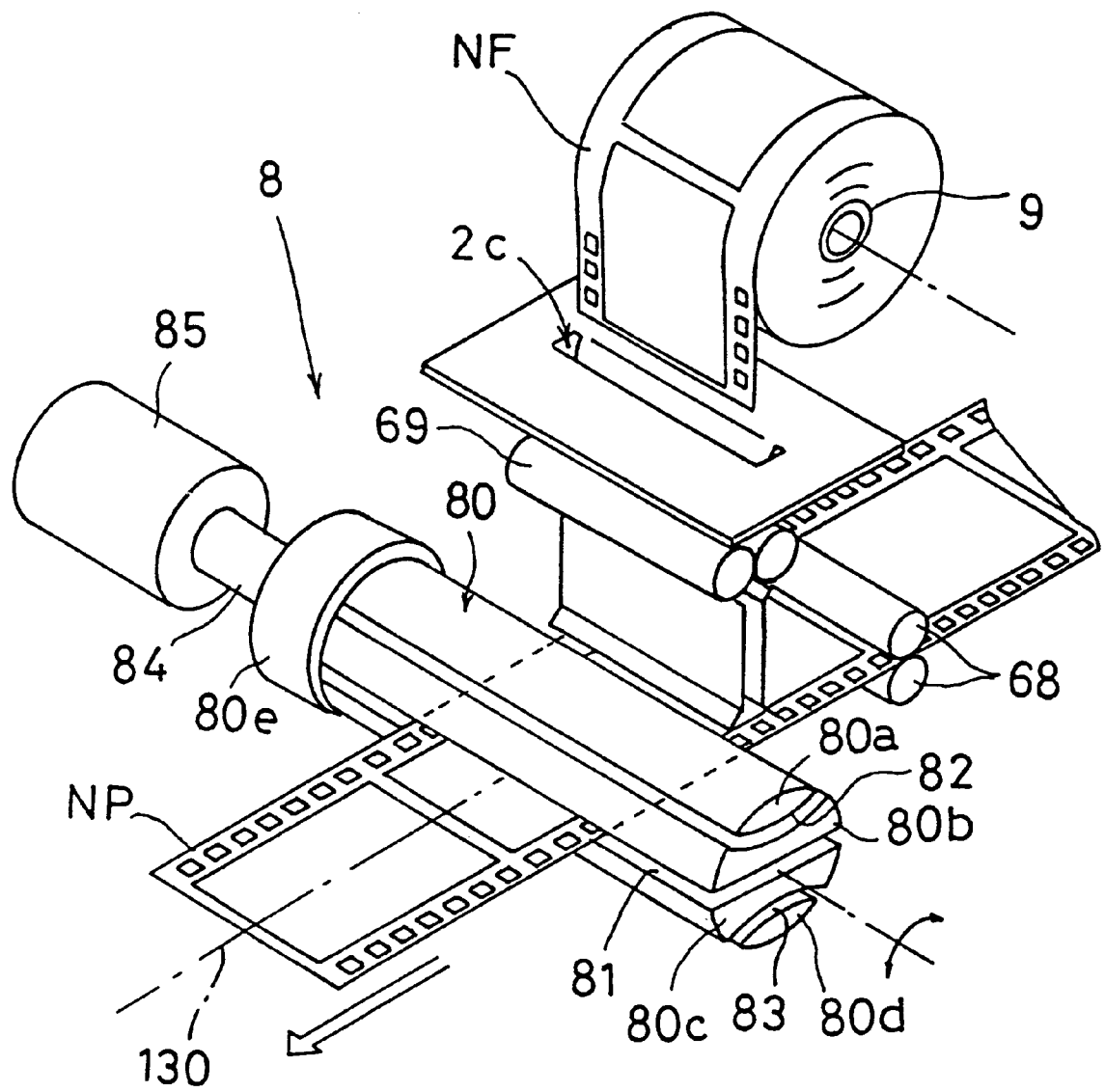
FIG. 16 is a perspective view of a branching device in one embodiment.

In this embodiment, as shown in FIG. 16, the branching device 8 includes a cylindrical branching drum 80, a rotary shaft 84 of the branching drum 80, and a drive device 85 in the form of a motor operatively connected to the rotary shaft 84 for rotating the branching drum 80 about its axis. The branching drum 80 is divided along its axis into two parts which are subdivided along curved surfaces to form four blocks, i.e. a first block 80a and a fourth block 80d each having a section like that of a convex lens, and a second block 80b and a third block 80c each having a section like that of a concave lens. As seen from FIG. 16, the blocks 80a–80d are joined together by a bush 80e to define a first, straight branch passage 81 between the second block 80b and third block 80c, a second branch passage 82 curved downward (in FIG. 16) between the first block 80a and second block 80b, and a third branch passage 83 curved upward (in FIG. 16) between the third block 80c and fourth block 80d.

Figure 17:
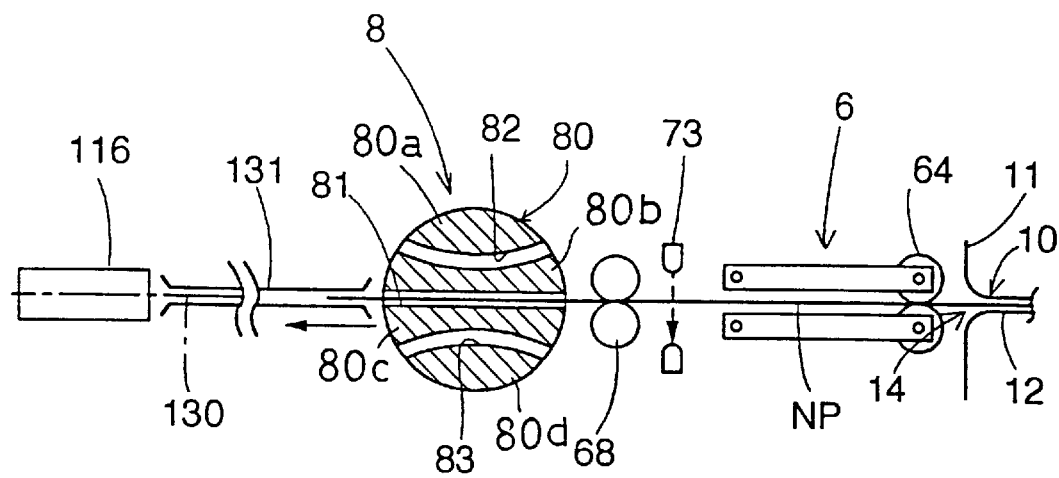
FIGS. 17A and 17B are explanatory views of operation of a branching drum.
Figure 17:
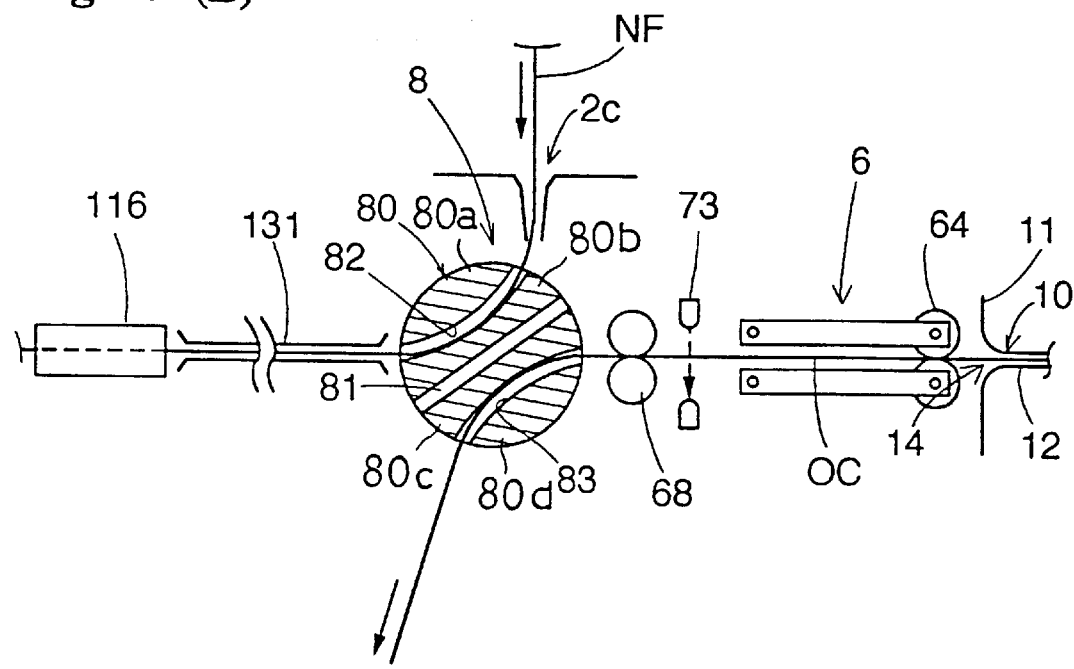

As shown in FIGS. 17A and 17B, the branching drum 80 is disposed between the transport line 130 to the exposing section and the handling device 6. Numeral 68 denotes drive rollers for smoothing transport of piece negatives NP between the handling device 6 and the branching drum 80. The elongate negative film inlet 2c is disposed above a portion of the branching drum 80 opposed to the handling device 6 for inserting an elongate negative film NF for use in simultaneous printing. Numeral 69 denotes drive rollers for smoothing transport of elongate negative film NF between the elongate negative film inlet 2c and the branching drum 80. The elongate negative film NF is wound around a known film reel 9 not shown in detail, and is fed continuously to the exposing section 110.

The branching drum 80 is switchable by the drive device 85 between a first position shown in FIG. 17A and a second position shown in FIG. 17B. This switching is achieved by the controller 140 giving a control signal to the drive device 85 to rotate the branching drum 80 by a predetermined angle in time of switching between a simultaneous printing process and a reorder process. In the first position of the branching drum 80, the first branch passage 81 forms a line for transporting piece negatives NP drawn out of the negative sheet 10 to the auto negative mask 116 of exposing section 110. In the second position of the branching drum 80, the second branch passage 82 forms a line for transporting the elongate film NF from the elongate negative film inlet 2c to the auto negative mask 116 in time of simultaneous printing, and the third branch passage 83 forms a line for allowing a reader 73 to read the reorder information from the reorder card OC drawn out of the negative sheet 10. Thus, in the second position, while feeding the elongate film NF into the transport line 130 to the exposing section 110, the reorder information may be read from the reorder card OC for the reorder process to be carried out as a next interrupt process.

Figure 18:
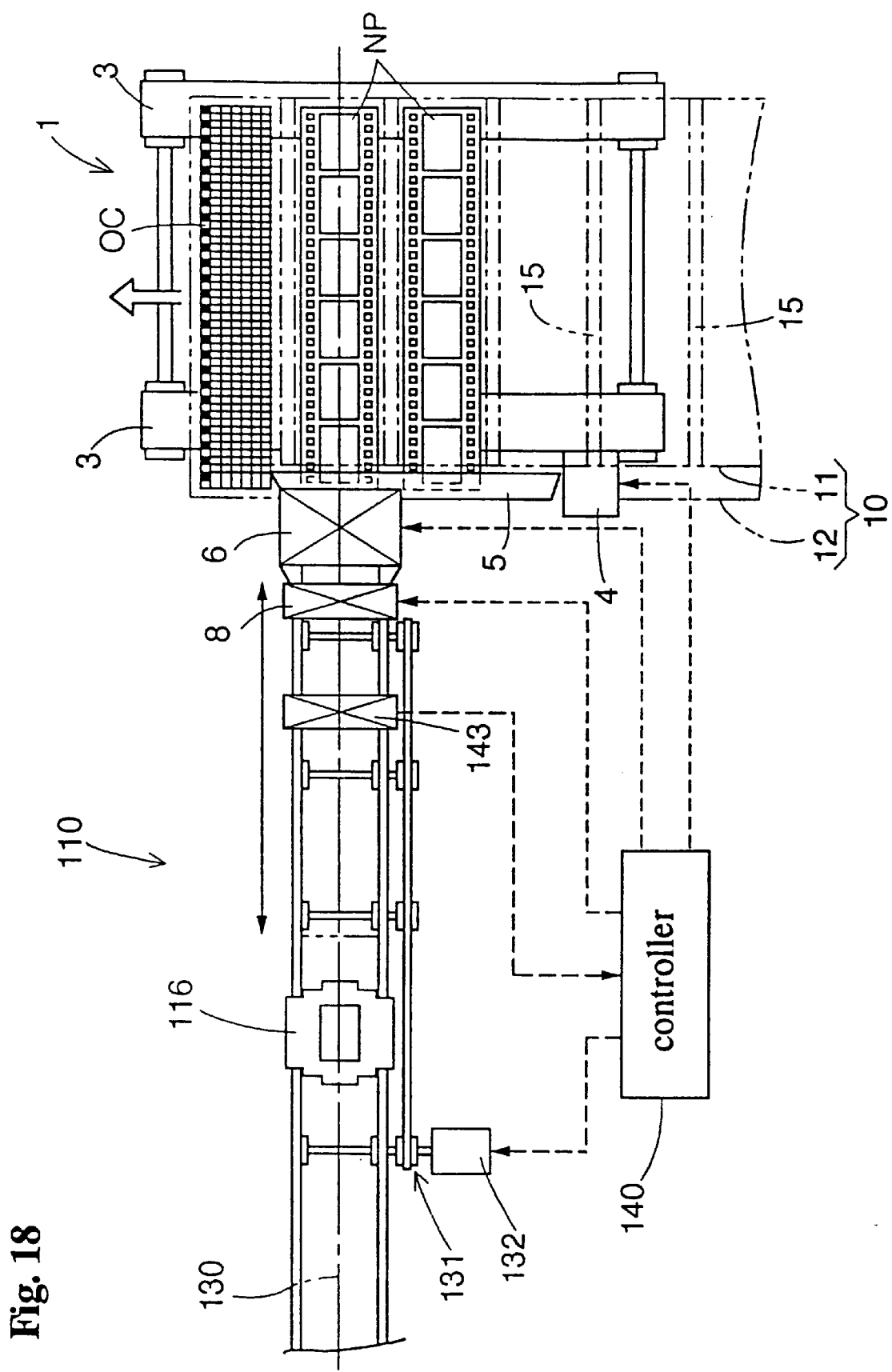
FIG. 18 is a schematic view illustrating an operation of the printer/processor shown in FIG. 1.

An operation of the above printer/processor 100 will be described with reference to the schematic view shown in FIG. 18.

In time of simultaneous printing, the branching drum 80 is set to the second position. Then, a single film or elongate film NF wound around the film reel is fed from the elongate negative film inlet 2c through the second branch passage 82 of branching drum 80 to the auto negative mask 116 to undergo an exposing process. This simultaneous printing process is performed in the same way as in a conventional printer/processor, and will not be described herein.

Figure 4:
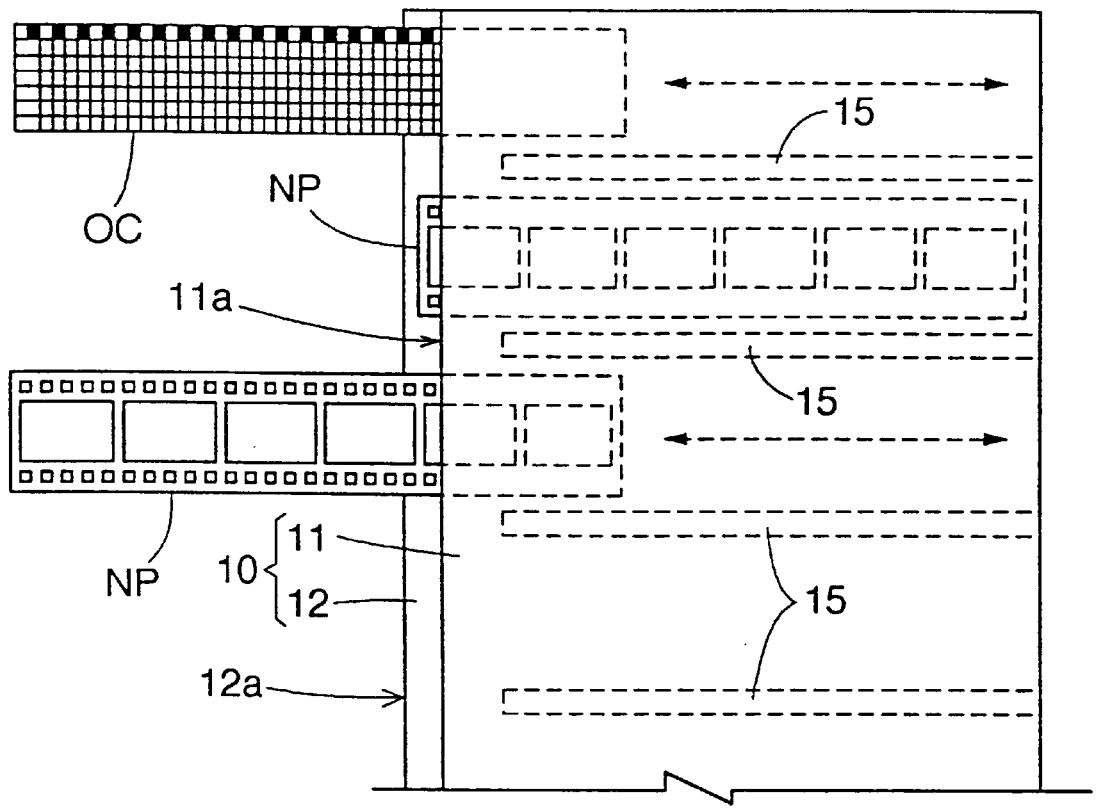
FIG. 4 is a plan view of a negative sheet containing a reorder card and piece negatives.
Figure 5:
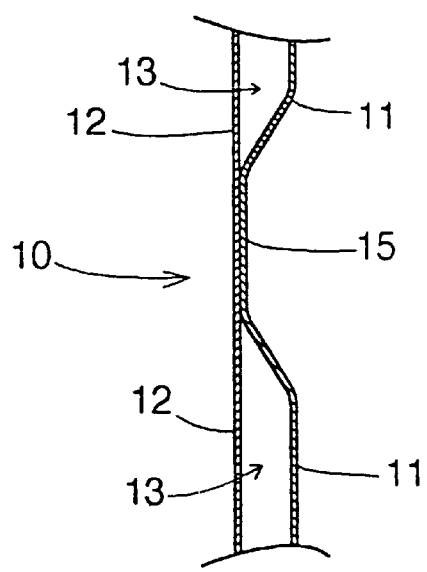
FIG. 5 a fragmentary section of the negative sheet.

When the simultaneous printing process is interrupted by a reorder process, the negative sheet 10 shown in FIG. 4 is first inserted into the negative sheet loader 2a of reorder processing unit 1. In the course of transport of the negative sheet 10 by the transport mechanism 3, the openings 14 are widened by the suction device 40 shown in FIG. 10. When the reorder card OC stored in the first pocket 13 reaches the transport line 130, the handling device 6 draws out the reorder card OC. The reorder card OC drawn out is fed through the third branch passage 83 of branching drum 80 set to the second position, while the reader 73 reads the mark sheet portion of the reorder card OC. After all the mark sheet portion is read and reorder information is transmitted to the controller 140, the reorder card OC is transported in the opposite direction and inserted back into the pocket 13.

It is known from the reorder information which pocket 13 contain a piece negative NP to be printed. The negative sheet 10 is transported until the piece negative NP to be printed reaches the transport line 130. The handling device 8 draws out the piece negative NP located on the transport line 130. Subsequently, the film transport mechanism 131 transports the piece negative NP through the first branch passage 81 of branching drum 80 set to the first position, to locate an image frame to be printed at the exposure point of auto negative mask 116. After exposing a required number of frames, the piece negative NP is returned through the same path to the pocket 13 of negative sheet 10. The piece negative NP enters the pocket 13 smoothly since, by then, this pocket 13 has been aligned accurately to the transport line 130 by a positional adjustment of joining lines 15 described hereinbefore. Subsequently, the negative sheet 10 is transported until a next piece negative NP to be printed reaches the transport line 130, and a similar process is performed. All these processes are collectively controlled by the controller 140, and therefore the simultaneous printing process and the reorder process may be performed in parallel within a range not interfering with each other. The reorder process may be carried out with a minimum reduction in the operating rate of the printer/processor 100.

While, in the above embodiment, the rotatable branching drum is employed as the branching device 8, it is possible to employ a branching device of the parallel displacement type.

What is claimed is:

1. A printer/processor for performing printing processes on two piece negatives taken out of a negative sheet and an elongate negative film, comprising:

a negative sheet loader for receiving said negative sheet containing said piece negatives;

handling means for drawing piece negatives out of said negative sheet; an elongate negative film inlet for receiving said elongate negative film; a transport line extending to an exposing section; and branching means for correcting said handling means and said transport line, and correcting said elongate negative film inlet and said transport line;

wherein said branching means includes:

a branching member selectively movable between a first position and a second position, said branching member having a first branch passage for correcting said handling means and said transport line in said first position, and a second branch passage for correcting said elongate negative film inlet and said transport line in said second position, said first branch passage and said second branch passage being formed independently of each other; and a drive device for moving said branching member between said first position and said second position.

2. A printer/processor as defined in claim 1, wherein said branching member comprises a cylindrical drum rotatable about an axis thereof, and wherein said drive device comprises a rotary drive device for rotating said cylindrical drum.

3. A printer/processor for performing printing processes on two piece negatives taken out of a negative sheet and an elongate negative film, comprising:

a negative sheet loader for receiving said negative sheet containing said piece negatives;

handling means for drawing, out of said negative sheet, said piece negatives and a reorder card having reorder information recorded thereon;

an elongate negative film inlet for receiving said elongate negative film; a transport line extending to an exposing section; and branching means for correcting said handling means and said transport line, and connecting said elongate negative film inlet and said transport line;

wherein said branching means includes:

a branching member selectively movable among a first position, a second position and a third position, said branching member having a first branch passage for connecting said handling means and said transport line in said first position, a second branch passage for connecting said elongate negative film inlet and said transport line in said second position, and a third branch passage defined as a shunt passage for connecting said handling means and an open space, said first branch passage, said second branch passage and said third branch passage being formed independently of each other; and a drive device for moving said branching member among said first position, said second position and said third position.

4. A printer/processor as defined in claim 3, wherein said branching member comprises a cylindrical drum rotatable about an axis thereof, and wherein said drive device comprises a rotary drive device for rotating said cylindrical drum.

5. A printer/processor as defined in claim 4, wherein said first branch passage extends straight, and said second branch passage and said third branch passage are curved.

6. A printer/processor as defined in claim 3, wherein said reorder information is read from said reorder card fed during a process of transporting said reorder card in said shunt passage.

7. A printer/processor for performing a printing process on piece negatives taken out of a negative sheet, comprising:

a negative sheet loader for receiving said negative sheet containing said piece negatives;

handling means for drawing said piece negatives out of said negative sheet;

a transport line extending to an exposing section; and branching means for connecting said handling means with said transport line and an opened space:

wherein said branching means includes:

a branching member selectively movable between a first position and a second position, said branching member having a piece negative branch passage for connecting said handling means with said transport line in said first position, and a shunt passage for connecting said handling means with said opened space in said second position, said piece negative branch passage and said shunt passage being formed independently of each other; and a drive device for moving said branching member between said first position and said second position.

8. A printer/processor as defined in claim 7, wherein said branching member comprises a cylindrical drum rotatable about an axis thereof, and wherein said drive device comprises a rotary drive device for rotating said cylindrical drum.

9. A printer/processor as defined in claim 7, wherein said reorder information is read from said reorder card fed during a process of transporting said reorder card in said shunt passage.

* * * * *